United States Patent
Liu

(10) Patent No.: US 11,194,592 B2
(45) Date of Patent: *Dec. 7, 2021

(54) SYSTEM FOR LAUNCHING A SOCIAL APPLICATION PAGE IN A FLOATING LAYER ON A MICROBLOG PAGE

(71) Applicant: Tencent Technology (Shenzhen) Company Limited, Shenzhen (CN)

(72) Inventor: Songyun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,431

(22) Filed: May 6, 2020

(65) Prior Publication Data

US 2020/0264896 A1 Aug. 20, 2020

Related U.S. Application Data

(63) Continuation of application No. 14/853,473, filed on Sep. 14, 2015, now Pat. No. 10,684,867, which is a
(Continued)

(30) Foreign Application Priority Data

Mar. 15, 2013 (CN) .......................... 201310082728.9

(51) Int. Cl.
*G06F 9/445* (2018.01)
*H04L 29/06* (2006.01)
*G06F 16/958* (2019.01)

(52) U.S. Cl.
CPC ............ *G06F 9/445* (2013.01); *G06F 16/958* (2019.01); *H04L 63/08* (2013.01)

(58) Field of Classification Search
CPC .... G06F 16/958; G06F 9/445; G06F 9/44521; H04L 63/08
See application file for complete search history.

(56) References Cited

U.S. PATENT DOCUMENTS 7,039,872 B1 5/2006 Raheman
7,877,687 B2 1/2011 Blinnikka et al.
(Continued)

FOREIGN PATENT DOCUMENTS

CN 101382867 A * 3/2009
CN 101382867 A 3/2009
(Continued)

OTHER PUBLICATIONS

Tencent Technology, ISRWO, PCT/CN2014/072676, May 30, 2014, 7 pgs.

(Continued)

*Primary Examiner* — Meng Ai T An
*Assistant Examiner* — Willy W Huaracha
(74) *Attorney, Agent, or Firm* — Morgan, Lewis & Bockius LLP

(57) ABSTRACT

According to an example, a computer creates an application entry in a social application page, receives a triggering operation command associated with the application entry, generates, based on the triggering operation command, a floating layer at a predetermined position on the social application page, receives application data at the floating layer, and runs an application in the floating layer based on the application data.

12 Claims, 7 Drawing Sheets

Related U.S. Application Data continuation of application No. PCT/CN2014/072676, filed on Feb. 28, 2014.

(56) References Cited

U.S. PATENT DOCUMENTS

| | | | |
|---|---|---|---|
| 8,275,394 B2* | 9/2012 | Mattila | H04W 4/021 |
| | | | 455/456.3 |
| 8,366,546 B1* | 2/2013 | Naik | G06Q 50/01 |
| | | | 463/31 |
| 2002/0042799 A1* | 4/2002 | Slotznick | G06F 16/957 |
| | | | 715/205 |
| 2005/0114430 A1 | 5/2005 | Zheng et al. | |
| 2006/0075359 A1* | 4/2006 | Bauchot | G06F 9/451 |
| | | | 715/790 |
| 2008/0195946 A1 | 8/2008 | Peri-Glass | |
| 2009/0048015 A1* | 2/2009 | Palmisano | G07F 17/3211 |
| | | | 463/25 |
| 2009/0299862 A1 | 12/2009 | Fan et al. | |
| 2012/0204221 A1* | 8/2012 | Monjas Llorente | H04L 63/102 |
| | | | 726/1 |
| 2013/0067035 A1 | 3/2013 | Amanat et al. | |
| 2013/0104072 A1 | 4/2013 | Havard | |
| 2015/0058713 A1 | 2/2015 | Fan et al. | |
| 2015/0304295 A1* | 10/2015 | Chiba | H04L 63/10 |
| | | | 726/4 |
| 2016/0259509 A1 | 9/2016 | Alexander et al. | |
| 2017/0372678 A1 | 12/2017 | Ying | |

FOREIGN PATENT DOCUMENTS

| | | | |
|---|---|---|---|
| CN | 102129348 A | | 7/2011 |
| CN | 102413464 A | * | 4/2012 |
| CN | 102724204 A | | 10/2012 |
| CN | 102819436 A | * | 12/2012 |
| CN | 102819436 A | | 12/2012 |
| CN | 102929486 A | | 2/2013 |
| CN | 106600538 A | | 4/2017 |
| CN | 106910161 A | | 6/2017 |
| CN | 107154021 A | | 9/2017 |
| CN | 108022212 A | | 5/2018 |
| WO | WO 2014/139361 A1 | | 9/2014 |

OTHER PUBLICATIONS

Tencent Technology, IPRP, PCT/CN2014/072676, Sep. 15, 2015, 5 pgs.

* cited by examiner

SYSTEM FOR LAUNCHING A SOCIAL APPLICATION PAGE IN A FLOATING LAYER ON A MICROBLOG PAGE

CROSS-REFERENCE TO RELATED APPLICATIONS

This application is a continuation application of U.S. patent application Ser. No. 14/853,473, filed Sep. 14, 2015, now U.S. Pat. No. 10,684,867 issued Jun. 16, 2020, which is a continuation application of International Patent Application No. PCT/CN2014/072676, filed Feb. 28, 2014, which claims priority to Chinese Patent Application No. 201310082728.9, filed Mar. 15, 2013, all of which are incorporated by reference in their entirety.

TECHNICAL FIELD

Various examples of the present disclosure relate to information processing technology, and more particularly, to a method, apparatus, and system for running an application.

BACKGROUND

Microblog may be defined to mean a platform for sharing, disseminating, and obtaining information based on a user relationship. Through the microblog platform and by employing a web, a wireless application protocol (WAP), and various client components, a user may update information using words, and share the information immediately. Compared with a blog in which layout arrangement is emphasized, contents of the microblog may be formed by a few simple words. As such, the microblog has lower technical requirements for the user, and requirements for language organization of the microblog may not be as higher as that of the blog. Various application programming interfaces (APIs) opened by the microblog allow a large number of users to instantly update their personal information by means of a mobile phone, a network, and so like. The microblog is characterized by stronger grass-roots, and is widely applied to various platforms such as a desktop, a browser, and a mobile terminal. Currently, the microblog has become a part of people's daily life. A person may obtain information and take social activities and entertainment through the microblog. Further, the social activities and the entertainment may be combined together, such as playing some social games with a buddy at the microblog.

An application may be a standard configuration of the microblog. When the user obtains core information (e.g., view microblog messages, or view buddy's recent activities) through the microblog, the user may also run some applications through the microblog, such as various games.

SUMMARY

According to various examples of the present disclosure, a method, an apparatus, and a system for running an application are provided, so that execution efficiency of the application may be improved.

According to an example of the present disclosure, a method for running an application is provided. The method includes: creating, by a computer, an application entry in a microblog page; receiving, by the computer, a triggering operation command associated with the application entry; generating, by the computer based on the triggering operation command, a floating layer at a predetermined position on the microblog page; receiving, by the computer, application data at the floating layer; and running, by the computer, an application in the floating layer based on the application data.

According to another example of the present disclosure, an apparatus for running an application is provided. The apparatus includes: an application entry creating module, to create an application entry in a microblog page; a floating layer generating module, to receive a triggering operation command associated with the application entry, and generate, based on the triggering operation command, a floating layer at a predetermined position on the microblog page; and an application running module, to receive application data at the floating layer, and run an application in the floating layer based on the application data.

According to another example of the present disclosure, a system for running an application is provided. The system includes: a terminal, to create an application entry in a microblog page, receive a triggering operation command associated with the application entry, generate, based on the triggering operation command, a floating layer at a predetermined position on the microblog page, receive application data at the floating layer, and run an application in the floating layer based on the application data; and an application server, to send the application data to the floating layer.

According to still another example of the present disclosure, a non-transitory computer-readable storage medium encoded with a plurality of instructions is provided. When the instructions are executed by one or more computers, the one or more computers are caused to perform operations including: creating an application entry in a microblog page; receiving a triggering operation command associated with the application entry; generating, based on the triggering operation command, a floating layer at a predetermined position on the microblog page; receiving application data at the floating layer; and running an application in the floating layer based on the application data.

As may be seen from the above descriptions that, according to various examples of the present disclosure, a computer may create an entry of an application in a microblog page, receive a triggering operation command associated with the application entry in the microblog page, generate, based on the triggering operation command, a floating layer at a predetermined position on the microblog page, receive application data at the floating layer, and may run the application in the floating layer based on the application data. By this manner, dissemination of the application may be promoted and entry depth for searching the application by the microblog user may significantly be reduced, as such, the microblog user may quickly and accurately locate the application, and thus the execution efficiency of the application may be improved.

BRIEF DESCRIPTION OF THE DRAWINGS

Features of the present disclosure are illustrated by way of example and not limited in the following figures, in which like numerals indicate like elements, in which.

DETAILED DESCRIPTION

Hereinafter, the present disclosure will be described in further detail with reference to the accompanying drawings and examples.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Conventionally, a way for running an application by various microblog platforms may include triggering an application menu in a microblog, navigating to an application-browsing page, selecting an interesting application in the application-browsing page, popping up a new application window, and executing the selected application in the newly-opened window.

However, in the conventional way as described above, a user needs to select the application in the application-browsing page, and therefore cannot quickly and accurately locate the application. As such, the difficulty for obtaining the application by the user may be increased and the execution efficiency of the application may be reduced. Moreover, in the conventional way as described above, the application is run in the newly-opened window, thus continuous presenting of a microblog page may be destroyed, and it is not convenient for the user to timely obtain information through the microblog platform, which may reduce the efficiency of the microblog platform.

Figure 1:
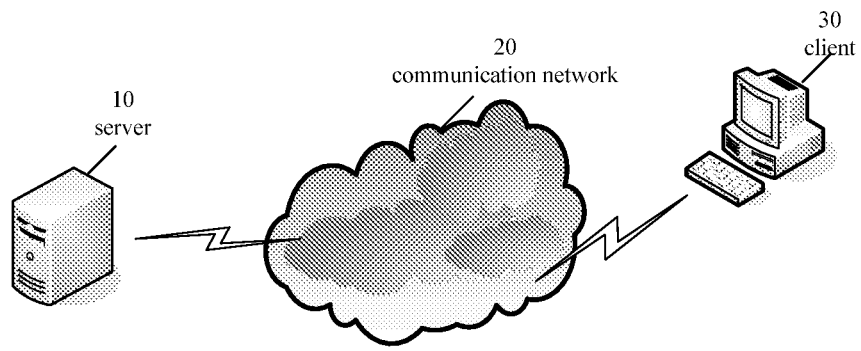
FIG. 1 is a schematic diagram illustrating an example of a communication system, according to an example of the present disclosure.

FIG. 1 is a schematic diagram illustrating an example of a communication system, according to an example of the present disclosure. The exemplary system may include a server 10, a client 30, and a communication network 20. The server 10 and the client 30 may be coupled through the communication network 20 for information exchange, such as sending/receiving authorization information, etc. Although only one client and one server are shown in the system, any number of clients or servers may be included, and other devices may also be included. The above server device and client device may employ a method for running an application described later, provided by examples of the present disclosure.

The communication network 20 may include any appropriate type of communication network for providing network connections to the server 10 and the client 30 or among multiple servers or clients. For example, the communication network 20 may include the Internet or other types of computer networks or telecommunication networks, either wired or wireless. In an example, the method, apparatus, and system disclosed later may be implemented, for example, in a wireless network that includes at least one client.

In some cases, the client 30 may refer to any appropriate user terminal with certain computing capabilities, such as a personal computer (PC), a work station computer, a server computer, a hand-held computing device (tablet), a smart phone or mobile phone, or any other user-side computing device. In various examples, the client 30 may include a network access device. The client can be stationary or mobile.

A server, as used herein, may refer to one or more server computers configured to provide certain server functionalities, such as database management and search engines. A server may also include one or more processors to execute computer programs in parallel.

Figure 2:
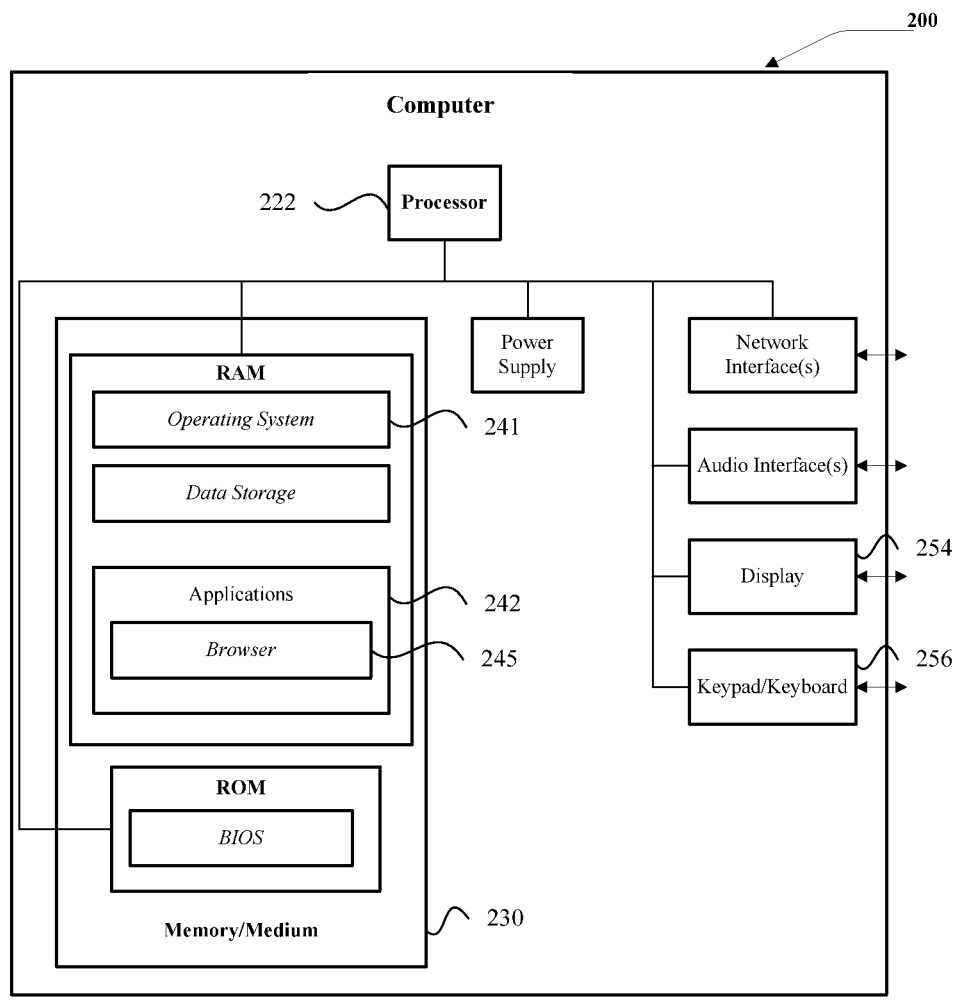
FIG. 2 is a schematic diagram illustrating an example of a computer, according to an example of the present disclosure.

FIG. 2 is a schematic diagram illustrating an example of a computer, according to an example of the present disclosure. The computer 200 as shown in FIG. 2 may be a computing device capable of executing a method, an apparatus, and a system that are described later and provided by examples of the present disclosure. The computer 200 may, for example, be a device such as a personal desktop computer or a portable device, such as a laptop computer, a tablet computer, a cellular telephone, or a smart phone. The computer 200 may also be a server that connects to the above devices locally or via a network.

The computer 200 may vary in terms of capabilities or features. Claimed subject matter is intended to cover a wide range of potential variations. For example, the computer 200 may include a keypad/keyboard 256. It may also include a display 254, such as a liquid crystal display (LCD), or a display with a high degree of functionality, such as a touch-sensitive color 2D or 3D display. In contrast, however, as in another example, a web-enabled computer 200 may include one or more physical or virtual keyboards, and mass storage medium 230.

The computer 200 may also include or may execute a variety of operating systems 241, including an operating system, such as a Windows™ or Linux™, or a mobile operating system, such as iOS™, Android™, or Windows Mobile™. The computer 200 may include or may execute a variety of possible applications 242, such as a browser 245. An application 242 may enable communication with other devices via a network, such as communicating with another computer via an Internet network.

Further, the computer 200 may include one or more non-transitory processor-readable storage media 230 and one or more processors 222 in communication with the non-transitory processor-readable storage media 230. For example, the non-transitory processor-readable storage media 230 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 230 may store sets of instructions, or units and/or modules that include the sets of instructions, for conducting operations described in the present disclosure. The one or more processors may be configured to execute the sets of instructions and perform the operations in the examples of the present disclosure.

Merely for illustration, only one processor may be described in the computer 200 that executes operations and/or method steps in the following examples. However, it should be noted that the computer 200 in the present disclosure may also include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 3:
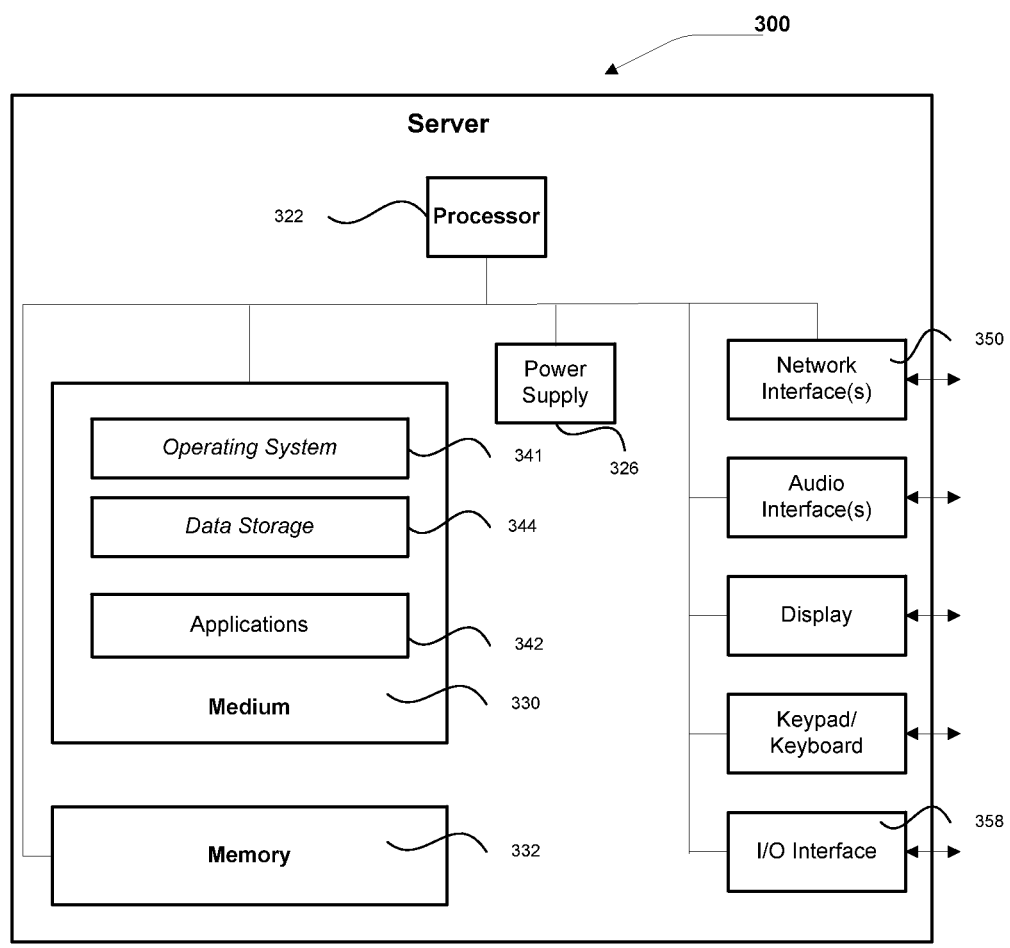
FIG. 3 is a schematic diagram illustrating an example of a server, according to an example of the present disclosure.

FIG. 3 is a schematic diagram illustrating an example of a server, according to an example of the present disclosure. The server 300 as shown in FIG. 3 may be configured to connect to the client device or another server locally via a network. The server 300 may vary widely in configuration or capabilities, but it may include one or more central processing units 322 and memory 332, one or more medium 330 (such as one or more mass storage devices) storing application programs 342 or data 344, one or more power supplies 326, one or more wired or wireless network interfaces 350, one or more input/output interfaces 358, and/or one or more operating systems 341, such as Windows Server™, Mac OS X™, Unix™, Linux™, FreeBSD™, or the like. The server 300 may include, for example, dedicated rack-mounted servers, desktop computers, laptop computers, set top boxes, mobile computational devices such as smart phones, integrated devices combining various features, such as two or more features of the foregoing devices, or the like. The server 300 may serve as an application server or a microblog server described later.

Figure 4:
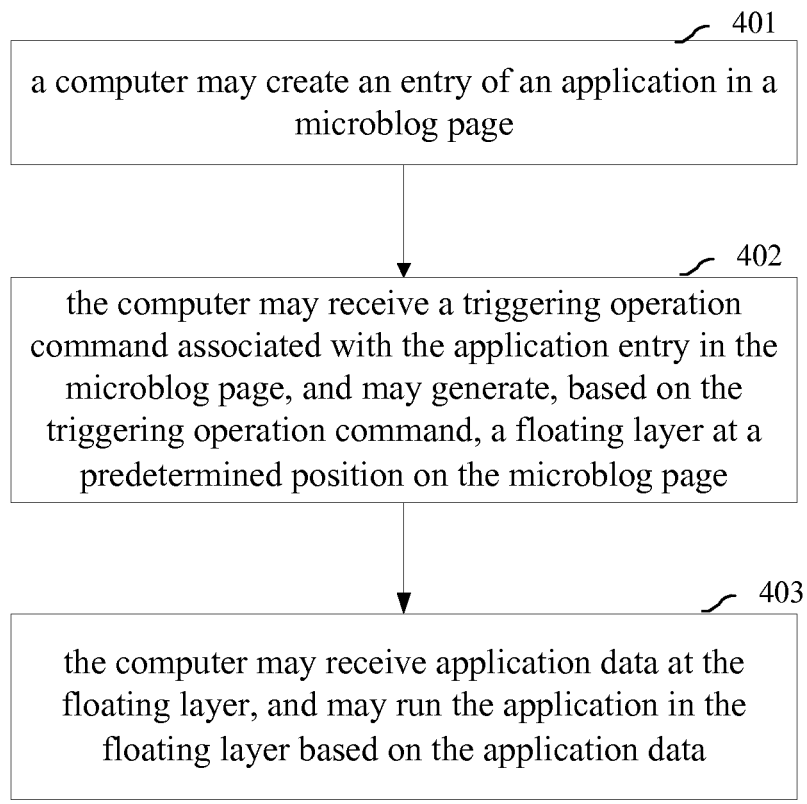
FIG. 4 is a flowchart illustrating a method for running an application, according to an example of the present disclosure.

FIG. 4 is a flowchart illustrating a method for running an application, according to an example of the present disclosure. As shown in FIG. 4. The method may include the following operations.

In block 401, a computer may create an entry of an application in a microblog page.

According to an example of the present disclosure, the application entry may be created based on various elements in the microblog page. An interface of the application may be entered through the application entry, e.g., the application entry may be linked to the application interface. According to an example of the present disclosure, the application entry may be presented in the form of a uniform resource locator (URL).

Specifically, the computer may create the application entry taking a broadcast message of the microblog page as a hyperlink carrier, or create the application entry taking a rebroadcast message of the microblog page as the hyperlink carrier, or create the application entry taking a comment message of the microblog page as the hyperlink carrier, or create the application entry taking a rebroadcasted comment message of the microblog page as the hyperlink carrier, or create the application entry taking contents of a microblog message or a picture in the microblog page as the hyperlink carrier, etc.

According to an example of the present disclosure, any element on a microblog timeline page may be used as the application entry. A timeline may be defined to mean to connect, through internet technology and according to a chronological order, one or more than one events in series to form a relatively complete record system, and to present the record system to the user by means of pictures and words. The timeline may be applied to different fields, and may systemize and complete a past thing.

For example, when a buddy of a microblog user executes an application, the buddy may post a micro message of which contents may be "play an application". At this time, any element in the microblog contents "play an application" may be used as an entry for entering an interface of the application. The user may find a microblog of the buddy through a microblog timeline of the user. As such, the user may timely see, at the microblog timeline of the user, the application run by the buddy, and may enter the interface of the application through the application entry in the microblog timeline of the user. By this manner, the microblog user may see, when browsing the microblog of the user, an application that is running by a person or a buddy whom the user is interested in. As most of the persons whom the microblog user may be interested in have a same interest as the microblog user, dissemination of the application may be promoted and entry depth for searching the application by the microblog user may significantly be reduced, as such, the microblog user may quickly and accurately locate the application, the difficulty for obtaining the application by the user may be reduced, and thus the execution efficiency of the application may be improved.

In block 402, the computer may receive a triggering operation command associated with the application entry in the microblog page, and may generate, based on the triggering operation command, a floating layer at a predetermined position on the microblog page.

In this case, the triggering operation command associated with the application entry in the microblog page may be received firstly. According to an example of the present disclosure, the triggering operation command may be a mouse-clicking operation command, a keyboard operation command, a touch operation command, a sound-control operation command, and so like.

After receiving the triggering operation command associated with the application entry in the microblog page, the computer may generate, based on the triggering operation command, the floating layer at the predetermined position on the microblog page.

According to an example, the computer may generate, based on the triggering operation command, the floating layer above the microblog page, and may configure a display attribute of the floating layer as transparency. In other words, the floating layer and the microblog page may be in a same window, the floating layer may be located above the microblog page, and the display attribute of the floating layer is transparency.

According to another example, the computer may generate, based on the triggering operation command, the floating layer at a blank area in the microblog page, and may configure a display attribute of the floating layer as opacity.

In other words, the floating layer and the microblog page may be in a same window, the floating layer may be in the blank area of the microblog page, and the display attribute of the floating layer is opacity.

According to still another example, the computer may divide, based on the triggering operation command, a window where the microblog page is in into a first area and a second area, in which the first area may display the microblog page and the second area may display the floating layer. In other words, the floating layer and the microblog page may be in a same window, the first area of the window may display the microblog page and the second area of the window may display the floating layer. According to an example of the present disclosure, sizes of the first area and the second area may be dynamically adjusted.

According to an example of the present disclosure, the computer may trigger, based on the triggering operation command, a script event to generate the floating layer at the predetermined position of the microblog page.

According to an example of the present disclosure, the floating layer may be implemented by means of an inline framework (hereinafter referred to as iframe). When the user triggers the application entry, a script event like JavaScript may be triggered to generate the iframe, which may be used as the floating layer. In this case, an application page (or an application interface) may be embedded in the iframe.

A script language may also be referred to as an expanded language, or a dynamic language. The script language is a programming language and may control a software application. Usually, a script may be stored in the form of text (e.g., American Standard Code for Information Interchange (ASCII)), and may be interpreted or compiled when the script is called. The script language may be interpreted and executed through a corresponding script engine.

The iframe may be a tag in the Hyper Text Mark-up Language (HTML), and may create a document within another document or create a floating frame. An iframe element may create an inline frame that includes another document.

Generally, an interpreter is required to run a script. According to an example of the present disclosure, the script language may include but may not be limited to Python, JavaScript, ASP, PHP, PERL, Nuva, or VBscript, and so on.

Attributes of the iframe tag may be shown as in Table 1.

| Attribute | Value | Description |
| --- | --- | --- |
| aign | Left right top middle bottom | Deprecate to use. Use style instead. Specify how to align the frame according to surrounding elements. |
| frameborder | 10 | Specify whether to display a border around the frame |
| height | pixels % | Specify height of the iframe |
| longdesc | URL | Specify a page, which includes a longer description about the iframe |
| margin height | pixels | Define margins on the top and bottom of the iframe. |
| margin width | pixels | Define margins on the left and right of the iframe |
| name | frame_name | Specify a name of the iframe |
| scrolling | yesnoauto | Specify whether to display a scroll bar in the iframe |
| src | URL | Specify a URL of a document displayed in the iframe |
| Width | pixels % | Define width of the iframe |

In block 403, the computer may receive application data at the floating layer, and may run the application in the floating layer based on the application data.

In this case, the computer may obtain, based on the triggering operation command, the application data from an application server, i.e., the application server may send the application data to the floating layer. The computer may run the application in the floating layer based on the application data. According to an example, the application interface may be presented in the floating layer, and various user interaction operations may be performed in the application interface, such as a game operation. According to another example, the application interface may be embedded in the iframe, and the application may be run in the application interface based on the application data.

According to an example of the present disclosure, a terminal that provides the floating layer and a medium for displaying the microblog page may be an intelligent terminal, which may include but may not be limited to a feature phone, a smart phone, a personal digital assistant (PDA), a personal computer (PC), a tablet PC, and so on.

Although some examples of the intelligent terminal are enumerated above, those skilled in the art may recognize that the enumeration may be for illustrative purpose and may not be intended to limit the protection scope of the present disclosure.

According to an example of the present disclosure, an operating system of the intelligent terminal that provides the floating layer and the medium for displaying the microblog page may include but may not be limited to Android™, Palm OS™, Symbian™, Windows Mobile™, Linux™, iPhone OS™, Black Berry OS™ 6.0, Windows Phone™ series, and so on.

According to an example of the present disclosure, the intelligent terminal that provides the floating layer and the medium for displaying the microblog page may employ the Android™ operating system, and the intelligent terminal may employ various versions of the Android™, which may include but may not be limited to Astro Boy (Android™ Beta), Clockwork Robot (Android™ 1.0), Cupcake (Android™ 1.5), Donut (Android™ 1.6), Eclair (Android™ 2.0/2.1), Froyo (Android™ 2.2), Gingerbread (Android™ 2.3), Honeycomb (Android™ 3.0), Ice Cream Sandwich (Android™ 4.0), Jelly Bean (Android™ 4.1), and so on.

Although some example versions of the Android™ platform are enumerated above, those skilled in the art may recognize that the enumeration may be for illustrative purposes and may not be intended to limit the protection scope of the present disclosure. Examples of the present disclosure may also be applicable to any other version being based on the Android™ software architecture.

According to an example of the present disclosure, the method as described above may further include operations in which:

the application in the floating layer may send an authorization request to a microblog server, in which the authorization request may include an identifier of the application (application ID) and an identifier of the microblog user (microblog user ID);

the microblog server may authenticate the authorization request based on the application ID and the microblog user ID, and may provide, when the authentication is passed, authorization information to the application in the floating layer; and the application in the floating layer may obtain, based on the authorization information, user information of the microblog user.

For example, most social applications may need to obtain user information and/or a user relationship chain, in which the user may authorize the application, and authorization information may be returned to the application. According to an example of the present disclosure, the authorization operation may be processed in the background. When the user clicks on the application in the floating layer, the floating layer may initiate the authorization request to a microblog server located in the background, in which the application ID and the user ID may be carried in the authorization request. The microblog server may receive the authorization request, and may perform authorization-verifying operation to the application based on the application ID and the user ID. When the authorization is passed, the microblog server may return the authorization information to the floating layer. In this case, the authorization information may include two parameters including an openid and an openkey, which may respectively indicate a user ID and a user password that are associated with the user and the application. That is, these two parameters may be affixed to the end of the URL (i.e., the application entry) filled in the iframe and may be transmitted to the application. Subsequently, when the application in the floating layer needs to obtain the user information from the microblog server, the openid and openkey may be carried for authenticating.

According to an example of the present disclosure, the method may further include receiving a microblog operation command associated with the microblog page, and performing a microblog operation in the microblog page based on the microblog operation command. In other words, an application operation and a microblog operation may be performed in a same window simultaneously.

Based on the above detailed description, an example of the present disclosure may provide an apparatus for running an application.

Figure 5A:
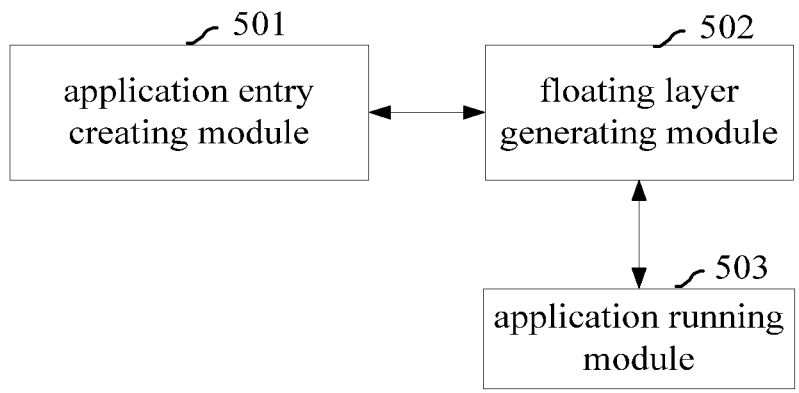
FIG. 5a is a schematic diagram illustrating a structure of an apparatus for running an application, according to an example of the present disclosure.

FIG. 5a is a schematic diagram illustrating a structure of the apparatus for running an application, according to an example of the present disclosure. As shown in FIG. 5a, the apparatus may include an application entry creating module 501, a floating layer generating module 502, and an application running module 503, in which:

the application entry creating module 501 may create an entry of an application in a microblog page;

the floating layer generating module 502 may receive a triggering operation command associated with the application entry in the microblog page, and may generate, based on the triggering operation command, a floating layer at a predetermined position on the microblog page; and the application running module 503 may receive application data at the floating layer, and may run the application in the floating layer based on the application data.

According to an example of the present disclosure, the application entry creating module 501 may create the application entry taking a broadcast message of the microblog page as a hyperlink carrier, or create the application entry taking a rebroadcast message of the microblog page as the hyperlink carrier, or create the application entry taking a comment message of the microblog page as the hyperlink carrier, or create the application entry taking a rebroadcasted comment message of the microblog page as the hyperlink carrier, or create the application entry taking contents of a microblog message or a picture in the microblog page as the hyperlink carrier.

According to an example of the present disclosure, the floating layer generating module 502 may generate, based on the triggering operation command, the floating layer above the microblog page, and may configure a display attribute of the floating layer as transparency.

According to another example of the present disclosure, the floating layer generating module 502 may generate, based on the triggering operation command, the floating layer at a blank area in the microblog page, and may configure a display attribute of the floating layer as opacity.

According to still another example of the present disclosure, the floating layer generating module 502 may divide, based on the triggering operation command, a window where the microblog page is in into a first area and a second area, in which the first area may display the microblog page and the second area may display the floating layer.

According to an example of the present disclosure, the floating layer generating module 502 may trigger, based on the triggering operation command, a script event to generate the floating layer at the predetermined position of the microblog page.

According to an example of the present disclosure, the floating layer may be implemented by means of an inline framework (also referred to as iframe).

According to an example of the present disclosure, the application running module 503 may embed an interface of the application in the iframe, and may run the application in the application interface based on the application data.

Figure 5B:
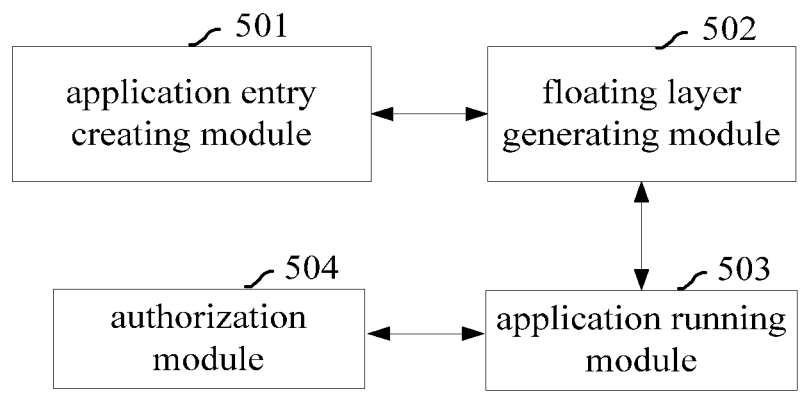
FIG. 5b is a schematic diagram illustrating a structure of an apparatus for running an application, according to another example of the present disclosure.

According to an example of the present disclosure, the apparatus may further include an authorization module 504, as shown in FIG. 5b. The authorization module 504 may enable the application in the floating layer to send an authorization request, in which the authorization request may include an application ID and a microblog user ID; receive an authentication message for authenticating the authorization request based on the application ID and the microblog user ID, and may receive authorization information returned when the authentication is passed.

Accordingly, the application running module 503 may enable the application in the floating layer to obtain, based on the authorization information, user information of the microblog user.

The above-mentioned modules may be software (e.g., machine readable instructions stored in a computer readable medium and executable by a processor), hardware (e.g., the processor of an application specific integrated circuit (ASIC)), or a combination thereof.

The above-mentioned modules in the examples of the present disclosure may be deployed either in a centralized or a distributed configuration; and may be either merged into a single module, or further split into a plurality of sub-modules.

Figure 5C:
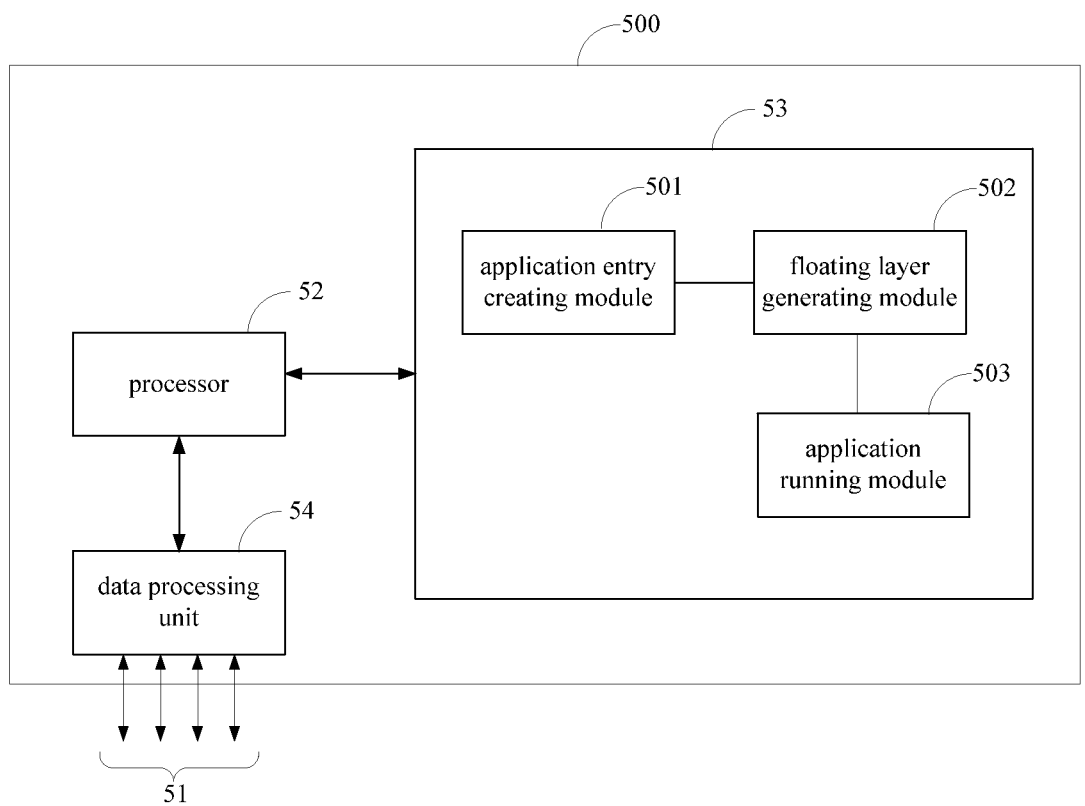
FIG. 5c is a schematic diagram illustrating a hardware structure of an apparatus for running an application, according to an example of the present disclosure.

An example of the present disclosure also provides an apparatus for running an application, as shown in FIG. 5c. The apparatus 500 may include ports 51, a processor 52, a storage 53, and a data processing unit 54. The data processing unit 54 may transmit data information received via the ports 51 to the processor 52 for processing, and may transmit data information from the processor 52 to the ports 51 for transmitting. The storage 53 may include machine-readable instruction modules to be executed by the processor 52, in which the machine-readable instruction modules may include: an application entry creating module 501, a floating layer generating module 502, and an application running module 503, in which:

the application entry creating module 501 may create an entry of an application in a microblog page;

the floating layer generating module 502 may receive a triggering operation command associated with the application entry in the microblog page, and may generate, based on the triggering operation command, a floating layer at a predetermined position on the microblog page; and the application running module 503 may receive application data at the floating layer, and may run the application in the floating layer based on the application data.

In an example of the present disclosure, the processor 52 can execute the machine-readable instruction modules stored in the storage 53 to perform all or part of the procedures described in the aforementioned method and apparatus examples, which are not repeated herein.

Figure 5D:
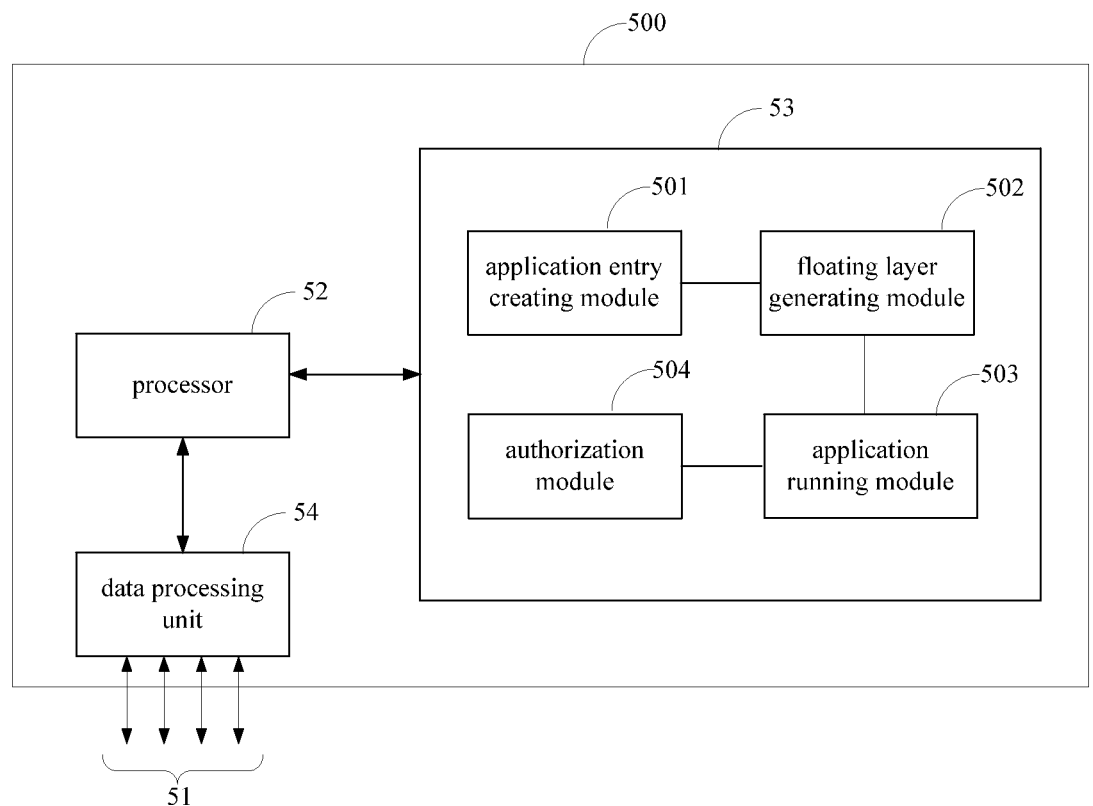
FIG. 5d is a schematic diagram illustrating a hardware structure of an apparatus for running an application, according to another example of the present disclosure.

As may be seen from the above description that, when the machine-readable instruction modules stored in the storage 53 are executed by the processor 52, functions of the aforementioned application entry creating module 501, the floating layer generating module 502, the application running module 503, and the authorization module 504 may be achieved. Therefore, an example of the hardware structure of the apparatus for running an application is shown in FIG. 5d.

Based on the above detailed description, an example of the present disclosure may provide a system for running an application.

Figure 6A:
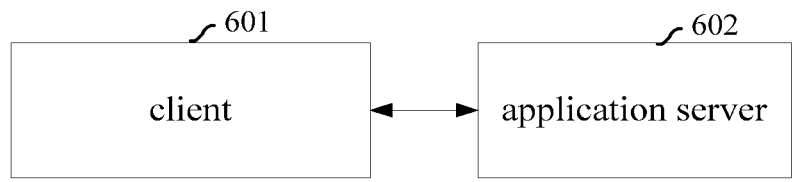
FIG. 6a is a schematic diagram illustrating a structure of a system for running an application, according to an example of the present disclosure.

FIG. 6a is a schematic diagram illustrating a structure of the system for running an application, according to an example of the present disclosure. As shown in FIG. 6a, the system may include a terminal 601 and an application server 602, in which:

the terminal 601 may create an entry of an application in a microblog page;

receive a triggering operation command associated with the application entry in the microblog page; generate, based on the triggering operation command, a floating layer at a predetermined position on the microblog page; receive application data at the floating layer, and may run the application in the floating layer based on the application data; and the application server 602 may send the application data to the floating layer.

According to an example of the present disclosure, the terminal 601 may create the application entry taking a broadcast message of the microblog page as a hyperlink carrier, or create the application entry taking a rebroadcast message of the microblog page as the hyperlink carrier, or create the application entry taking a comment message of the microblog page as the hyperlink carrier, or create the application entry taking a rebroadcasted comment message of the microblog page as the hyperlink carrier, or create the application entry taking contents of a microblog message or a picture in the microblog page as the hyperlink carrier.

According to an example of the present disclosure, the terminal 601 may generate, based on the triggering operation command, the floating layer above the microblog page, and may configure a display attribute of the floating layer as transparency.

According to another example of the present disclosure, the terminal 601 may generate, based on the triggering operation command, the floating layer at a blank area in the microblog page, and may configure a display attribute of the floating layer as opacity.

According to still another example of the present disclosure, the terminal 601 may divide, based on the triggering operation command, a window where the microblog page is in into a first area and a second area, in which the first area may display the microblog page and the second area may display the floating layer.

According to an example of the present disclosure, the terminal 601 may trigger, based on the triggering operation command, a script event to generate the floating layer at the predetermined position of the microblog page. According to an example of the present disclosure, the floating layer may be implemented by means of an inline framework (also referred to as iframe). In this case, the terminal 601 may embed an interface of the application in the iframe, and may run the application in the application interface based on the application data.

Figure 6B:
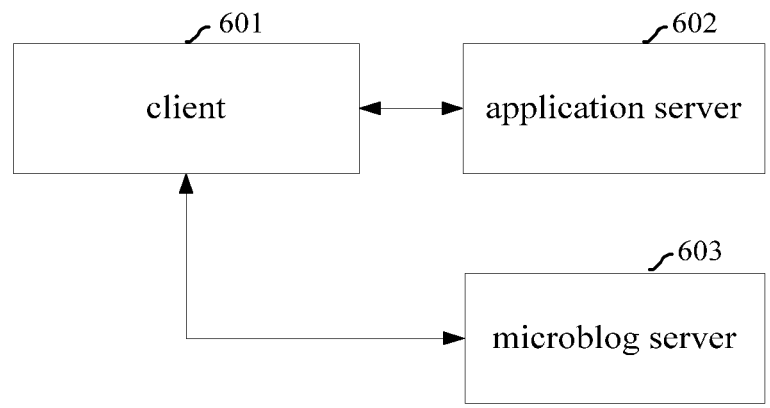
FIG. 6b is a schematic diagram illustrating a structure of a system for running an application, according to another example of the present disclosure.

According to an example of the present disclosure, the system may further include a microblog server 603, as shown in FIG. 6b. In this case, the terminal 601 may send, after the application in the floating layer is run, an authorization request to the microblog server 603, in which the authorization request may include an application ID and a microblog user ID. The microblog server 603 may authenticate the authorization request based on the application ID and the microblog user ID, and may transmit authorization information to the terminal 601 when the authentication is passed.

Accordingly, the terminal 601 may enable the application in the floating layer to obtain, based on the authorization information, user information of the microblog user.

Figure 7:
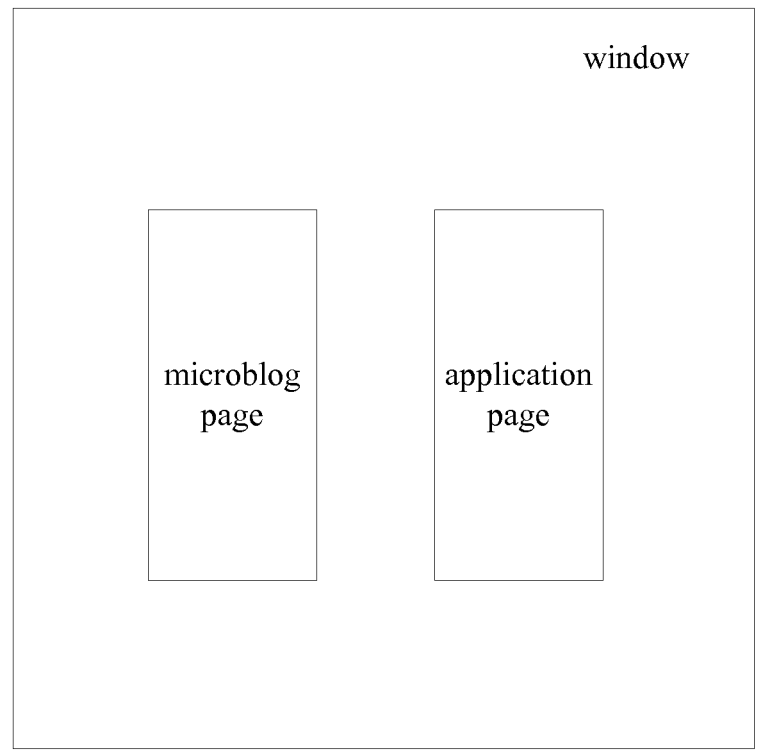
FIG. 7 is a schematic diagram illustrating an example of presenting an application page and a microblog page, according to an example of the present disclosure.
Figure 8:
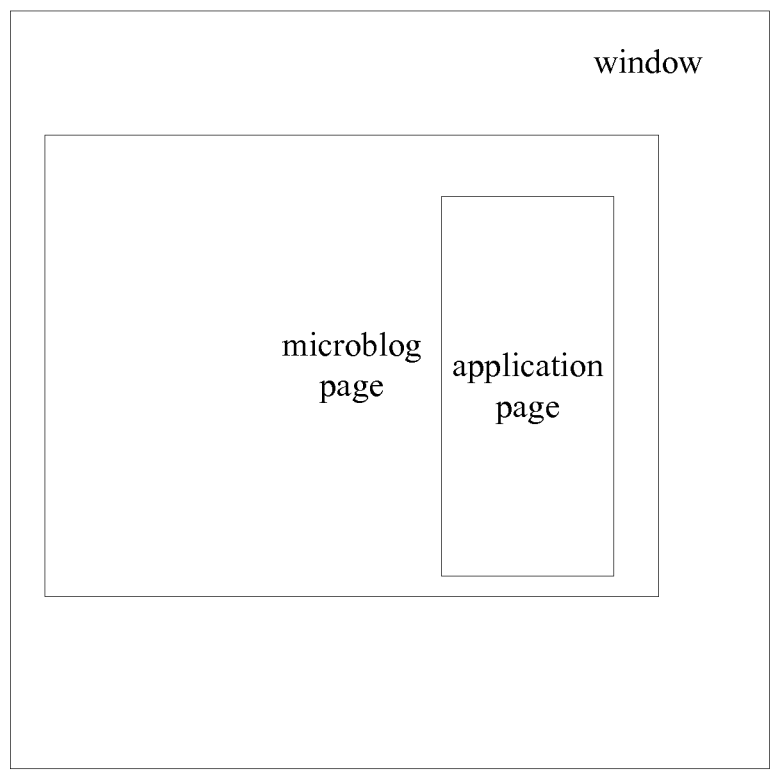
FIG. 8 is a schematic diagram illustrating an example of presenting an application page and a microblog page, according to another example of the present disclosure.

FIG. 7 is a schematic diagram illustrating an example of presenting an application page and a microblog page, according to an example of the present disclosure. FIG. 8 is a schematic diagram illustrating an example of presenting an application page and a microblog page, according to another example of the present disclosure.

As shown in FIG. 7, a window where a microblog page is in may be divided into a first area and a second area, in which the first area may display the microblog page and the second area may display a floating layer, and the floating layer may display an application interface. In other words, the floating layer and the microblog page may be in a same window, the first area of the window may display the microblog page and the second area of the window may display the floating layer. According to an example of the present disclosure, sizes of the first area and the second area may be dynamically adjusted.

As shown in FIG. 8, a floating layer may be generated above a microblog page, in which the floating layer may display an application interface. According to an example of the present disclosure, a display attribute of the floating layer may be configured as transparency. In other words, the floating layer and the microblog page may be in a same window, the floating layer may be located above the microblog page, and the display attribute of the floating layer is transparency.

In fact, various ways may be employed to implement the method, apparatus, and system for running an application, provided by examples of the present disclosure. For example, the method for running an application may be programmed, based on a standardized API, as a plug-in that may be installed in a mobile device, or may be encapsulated as an application for downloading by the user. When the method is programmed as the plug-in, various forms of the plug-in may be employed, including ocx, dll, cab, etc. The method for running an application provided by examples of the present disclosure may also be implemented through other specific technologies including a Flash plug-in, a RealPlayer plug-in, a MMS plug-in, a MIDI stave notation plug-in, an ActiveX plug-ins, and so like.

As may be seen from the above descriptions that, according to various examples of the present disclosure, a computer may create an entry of an application in a microblog page, receive a triggering operation command associated with the application entry in the microblog page, generate, based on the triggering operation command, a floating layer at a predetermined position on the microblog page, receive application data at the floating layer, and may run the application in the floating layer based on the application data. By this manner, dissemination of the application may be promoted and entry depth for searching the application by the microblog user may significantly be reduced, as such, the microblog user may quickly and accurately locate the application, and thus the execution efficiency of the application may be improved. Moreover, when the examples of the present disclosure are employed, the floating layer where the application is run and the microblog page are in a same window, and the application may be run without interrupting a microblog operation of the user, thus continuous presenting of the microblog page may be ensured, and it is convenient for the user to timely obtain information through the microblog platform, and thus the efficiency of the microblog platform may be improved.

Further, examples of the present disclosure may be applied to various terminals, and may also be employed cross-platform or cross-terminal. As such, the utilization scope is very wide.

According to an example of the present disclosure, a machine-readable storage medium is also provided, which is to store machine-readable instructions to cause a machine to execute the technical scheme as disclosed herein. Specifically, a system or apparatus having a storage medium which stores machine-readable instructions for implementing functions of any of the above examples and which may make the system or the apparatus (or CPU or MPU) read and execute the machine-readable instructions stored in the storage medium. In this situation, the machine-readable instructions read from the storage medium may implement any one of the above examples, thus the machine-readable instructions and the storage medium storing the machine-readable instructions are part of the technical scheme.

The storage medium for providing the machine-readable instructions may include floppy disk, hard drive, magneto-optical disk, compact disk (such as CD-ROM, CD-R, CD-RW, DVD-ROM, DVD-RAM, DVD-RW, DVD+RW), magnetic tape drive, flash memory, USB flash disk, CF card, SD card, MMC card, SM card, SDHC card, Memory stick, xD card, and so on. Optionally, the machine-readable instructions may be downloaded from a server computer via a communication network.

The above examples may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate array, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the examples disclosed herein may be implemented in the form of a computer software product.

The computer software product may be stored in a non-transitory storage medium and may include a plurality of instructions for making a computer apparatus (which may be a personal computer, a server or a network apparatus such as a router, switch, access point, etc.) implement the method recited in the examples of the present disclosure.

Those skilled in the art may understand that all or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, in which the modules or procedures shown in the figures may not be necessarily essential for implementing the present disclosure. Certain procedures or modules may be omitted according to the needs. The order of the procedures is not fixed, and can be adjusted according to the needs. Those skilled in the art can understand the modules in the apparatus of examples of the present disclosure may be located in the apparatus as described in the examples, or may be located in one or more apparatuses of the examples of the present disclosure when modified accordingly. The modules in the aforesaid examples may be combined into one module or further divided into a plurality of sub-modules.

The above are several examples of the present disclosure, and are not used for limiting the protection scope of the present disclosure. Any modifications, equivalents, improvements, etc., made under the principle of the present disclosure should be included in the protection scope of the present disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for running a social application at a computing device communicatively connected to a remote server and an application server, comprising:

displaying a social application page associated with a first user of the social application, the social application page including a plurality of messages arranged in a chronological order, the plurality of messages from a plurality of buddies of the first user on the social application, wherein the plurality of messages include a first message from a first buddy of the first user, the first message including an application entry corresponding to a game application of a game being played by the first buddy when posting the first message on the social application, wherein the application entry is linked to an interface of the game application;

receiving user selection of the application entry from the first user of the social application;

in response to the user selection of the application entry:
generating a floating layer as an inline framework at a predetermined position on the social application page, adjacent to the plurality of messages, by initiating a script event to generate the floating layer at the predetermined position of the social application page by means of the inline framework, and embedding the interface of the game application in the inline framework; and sending an authorization request to the remote server hosting the social application, wherein the authorization request comprises an identifier of the game application of the game played by the first buddy and an identifier of the first user at the social application;

receiving, from the remote server, authorization information, wherein:

the authorization information is generated by the remote server after authenticating the identifier of the game application and the identifier of the first user of the social application; and the authorization information is displayed in the floating layer and comprises a link that includes a first identifier corresponding to the identifier of the first user and a key corresponding to a user password for the game application, wherein the first identifier and the key are appended at an end of the link;

receiving, from the application server, game application data at the floating layer; and launching the game application in the floating layer on the social application page based on the game application data, the first identifier, and the key in the authorization information and in accordance with user selection of the link, while rendering the plurality of messages in the social application page simultaneously.

2. The method of claim 1, wherein the floating layer is configured to be transparent and overlap at least a portion of the social application page.

3. The method of claim 1, wherein the application entry in the social application page is created by receiving a broadcast message of the social application page as a hyperlink carrier; or receiving a rebroadcast message of the social application page as the hyperlink carrier; or receiving a comment message of the social application page as the hyperlink carrier; or receiving a rebroadcasted comment message of the social application page as the hyperlink carrier; or receiving contents of a corresponding message in the social application page as the hyperlink carrier.

4. The method of claim 1, further comprising:

receiving an operation command associated with the social application page, wherein the operation command is an interaction by the first user with the social application page; and performing an operation in the social application page based on the operation command.

5. A computing device for running a social application, the computing device communicatively connected to a remote server and an application server, comprising:

a processor and a non-volatile memory, wherein the non-volatile memory stores one or more computer readable instructions, and the processor executes the computer readable instructions stored in the non-volatile memory to perform a plurality of operations including:

displaying a social application page associated with a first user of the social application, the social application page including a plurality of messages arranged in a chronological order, the plurality of messages from a plurality of buddies of the first user on the social application, wherein the plurality of messages include a first message from a first buddy of the first user, the first message including an application entry corresponding to a game application of a game being played by the first buddy when posting the first message on the social application, wherein the application entry is linked to an interface of the game application;

receiving user selection of the application entry from the first user of the social application;

in response to the user selection of the application entry:

generating a floating layer as an inline framework at a predetermined position on the social application page, adjacent to the plurality of messages, by initiating a script event to generate the floating layer at the predetermined position of the social application page by means of the inline framework, and embedding the interface of the game application in the inline framework; and sending an authorization request to the remote server hosting the social application, wherein the authorization request comprises an identifier of the game application of the game played by the first buddy and an identifier of the first user at the social application;

receiving, from the remote server, authorization information, wherein:

the authorization information is generated by the remote server after authenticating the identifier of the game application and the identifier of the first user of the social application; and the authorization information is displayed in the floating layer and comprises a link that includes a first identifier corresponding to the identifier of the first user and a key corresponding to a user password for the game application, wherein the first identifier and the key are appended at an end of the link;

receiving, from the application server, game application data at the floating layer; and launching the game application in the floating layer on the social application page based on the game application data, the first identifier, and the key in the authorization information and in accordance with user selection of the link, while rendering the plurality of messages in the social application page simultaneously.

6. The computing device of claim 5, wherein the floating layer is configured to be transparent and overlap at least a portion of the social application page.

7. The computing device of claim 5, wherein the application entry in the social application page is created by receiving a broadcast message of the social application page as a hyperlink carrier; or receiving a rebroadcast message of the social application page as the hyperlink carrier; or receiving a comment message of the social application page as the hyperlink carrier; or receiving a rebroadcasted comment message of the social application page as the hyperlink carrier; or receiving contents of a corresponding message in the social application page as the hyperlink carrier.

8. The computing device of claim 5, wherein the plurality of operations further comprise:

receiving an operation command associated with the social application page, wherein the operation command is an interaction by the first user with the social application page; and performing an operation in the social application page based on the operation command.

9. A non-transitory computer-readable storage medium encoded with a plurality of instructions for running a social application that, when executed by a processor of a computing device that is communicatively connected to a remote server and an application server, cause the computing device to perform operations including:

displaying a social application page associated with a first user of the social application, the social application page including a plurality of messages arranged in a chronological order, the plurality of messages from a plurality of buddies of the first user on the social application, wherein the plurality of messages include a first message from a first buddy of the first user, the first message including an application entry corresponding to a game application of a game being played by the first buddy when posting the first message on the social application, wherein the application entry is linked to an interface of the game application;

receiving user selection of the application entry from the first user of the social application;

in response to the user selection of the application entry:
    generating a floating layer as an inline framework at a predetermined position on the social application page, adjacent to the plurality of messages, by initiating a script event to generate the floating layer at the predetermined position of the social application page by means of the inline framework, and embedding the interface of the game application in the inline framework; and
    sending an authorization request to the remote server hosting the social application, wherein the authorization request comprises an identifier of the game application of the game played by the first buddy and an identifier of the first user at the social application;

receiving, from the remote server, authorization information, wherein:
    the authorization information is generated by the remote server after authenticating the identifier of the game application and the identifier of the first user of the social application; and
    the authorization information is displayed in the floating layer and comprises a link that includes a first identifier corresponding to the identifier of the first user and a key corresponding to a user password for the game application, wherein the first identifier and the key are appended at an end of the link; and receiving, from the application server, game application data at the floating layer; and launching the game application in the floating layer on the social application page based on the game application data, the first identifier, and the key in the authorization information and in accordance with user selection of the link, while rendering the plurality of messages in the social application page simultaneously.

10. The non-transitory computer-readable storage medium of claim 9, wherein the floating layer is configured to be transparent and overlap at least a portion of the social application page.

11. The non-transitory computer-readable storage medium of claim 9, wherein the application entry in the social application page is created by receiving a broadcast message of the social application page as a hyperlink carrier; or receiving a rebroadcast message of the social application page as the hyperlink carrier; or receiving a comment message of the social application page as the hyperlink carrier; or receiving a rebroadcasted comment message of the social application page as the hyperlink carrier; or receiving contents of a corresponding message in the social application page as the hyperlink carrier.

12. The non-transitory computer-readable storage medium of claim 9, wherein the plurality of operations further comprise:
    receiving an operation command associated with the social application page, wherein the operation command is an interaction by the first user with the social application page; and
    performing an operation in the social application page based on the operation command.

* * * * *